United States Patent Office 3,526,000
Patented Aug. 25, 1970

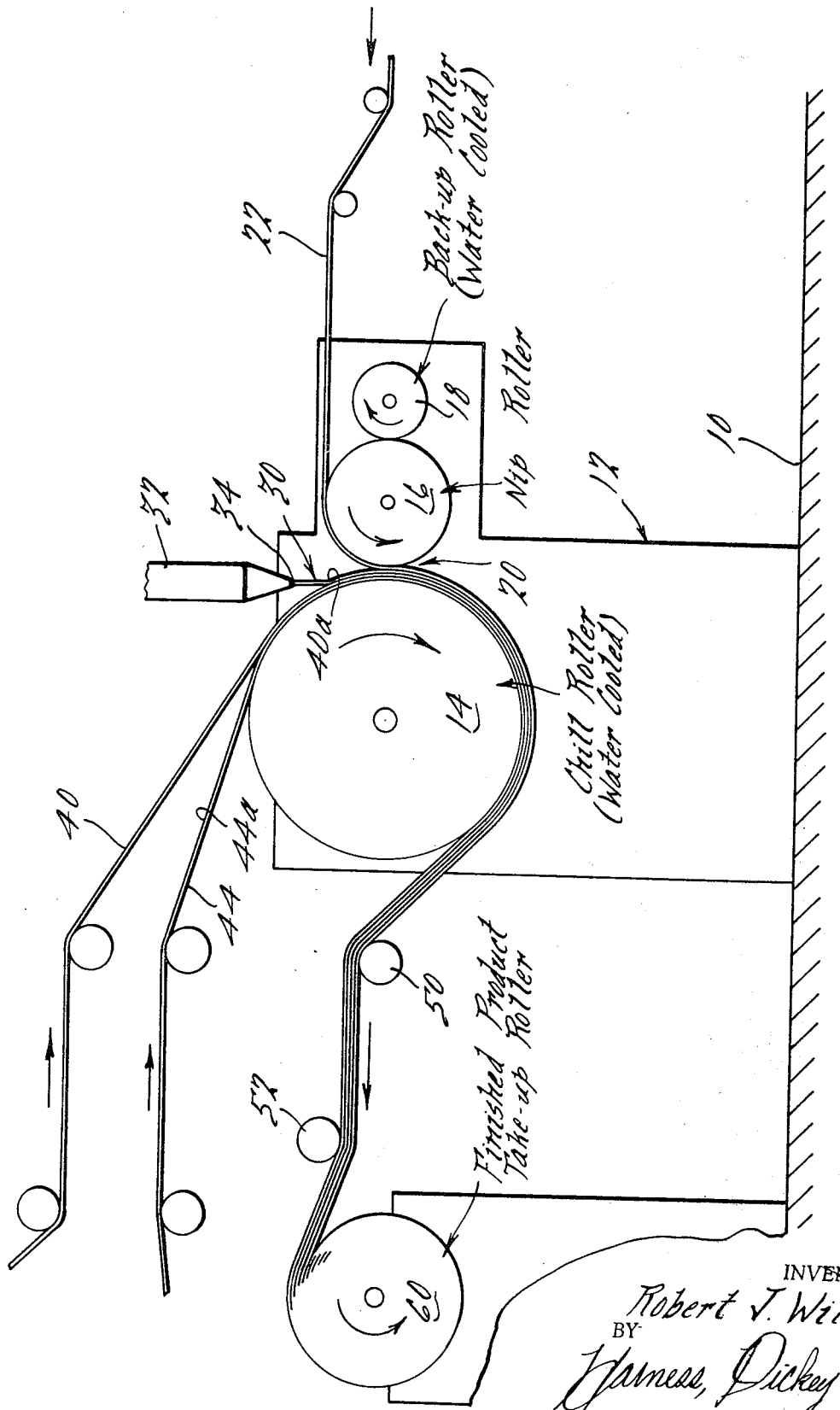

3,526,000
METHOD OF PREPARING A LAMINATED PRODUCT OF AT LEAST THREE PLIES
Robert J. Williams, Birmingham, Mich., assignor to Cadillac Products, Inc., Warren, Mich., a corporation of Michigan
Filed Nov. 18, 1968, Ser. No. 776,488
Int. Cl. B32b 7/00
U.S. Cl. 156—82                              25 Claims

ABSTRACT OF THE DISCLOSURE

A process for preparing a heat sealed laminated product of at least three or more plies which generally comprises bringing the first ply or substrate layer into firm contact with a second layer or ply formed of a hot extruded film forming plastic material (such as extruded polyethylene), between a pair of oppositely rotating surfaces formed by a chill roller and a nip roller; essentially simultaneously bringing a third ply layer into firm contact, between said rotating surfaces with the extruded film forming plastic material, whereby said extruded material effectively bonds the first ply to the third ply; essentially simultaneously bringing a fourth ply of plastic material into firm contact, between said rotating surfaces, such that an electronic or flame-treated surface of the plastic material is in contact with the third ply, and whereby there is effectively produced a heat sealed bond between the third and fourth ply substantially due to heat generated from the hot extruded plastic material; and, collecting the laminated product. Another process embodiment herein involves the preparation of a heat sealed dry laminated product of at least three plies comprising a ply of an extruded film forming plastic material, a ply of a material layer dissimilar from the film forming plastic material, and a ply of a surface treated plastic material, wherein said process comprises bringing the hot extruded film forming plastic material into contact with said material layer whereby the heat generated by the hot extruded material is sufficient to cause a heat sealed bond to occur between the other side of said material layer and the surface treated side of the plastic material, with all three plies being laminated or bonded together during passage between a nip section formed by oppositely rotating surfaces.

BACKGROUND OF THE INVENTION

This invention broadly relates to a lamination process and the product produced thereby; and, more particularly, the invention relates to a four ply dry lamination process and the product produced.

The state of the prior art patents known to the applicant herein as determined by a preliminary examination made prior to the filing of application for patent is as follows: U.S. Pat. 3,360,412 issued to James, No. 3,081,214 issued to Strome, No. 3,018,189 issued to Traver, No. 2,920,733 issued to Sorel, No. 2,897,109 issued to Voigtman, No. 2,922,883 issued to Giaimo; and, also the following U.S. Pats.: 2,154,493; 2,154,474; 2,334,485; 2,423,869; 2,637,673; 2,650,213; 2,702,580; 2,714,569; 2,714,571; 2,723,935; 2,728,703; 3,276,900; 2,890,590; 3,287,197; 2,794,485; 3,149,013; 3,196,766; 2,867,560; 2,922,732; 2,940,869; 2,988,051; 3,057,766; 3,093,525; 3,132,065; 3,157,526; 3,247,041; 3,256,598; 3,034,974; 2,861,022; 2,715,075; 3,308,509; 3,298,559; 3,256,560; 2,259,347; 2,538,520; 2,551,591; 2,769,206; 2,820,722; 3,062,698.

The object of this invention is to provide an improved lamination process and an improved product produced thereby.

An other object of the prsent invention is to provide an improved process of preparing a laminated product comprised of at least three, and preferably four or more laminated layers.

Another object of the present invention is to provide an improved process of preparing a water vaporproof, flexible, heat sealable barrier material.

Still another object of the present invention is to provide an improved process wherein a laminated product comprised of four or more layers can be made in general by passing the four or more layers essentially simultaneously between a chill roller and a nip roller whereby the four or more layers are essentially simultaneously bonded together to form the finished product.

Another object of the present invention is to provide an improved process wherein a four ply laminated product is prepared in a once through operation.

Still another object of the present invention is to provide an improved lamination process wherein the heat generated by an extruded film forming plastic material causes a heat sealed bond to be formed between the first and third ply layers of the product, and in particular said generated heat causes a heat sealed bond to occur between the oxidized surface of a plastic sheet and an adjacent material layer of the product, all in a once through operation.

Still another and more specific object of the present invention is to provide an improved lamination process wherein a first ply substrate layer is effectively bonded to a third ply layer such as foil, paper, or the like with the bond being effected by an intermediate second ply layer formed by an extruded film of polyethylene, and also wherein the heat generated by the extruded film of polyethylene causes a heat sealed bond to occur between the third ply and a four ply plastic material which has an electronic treated or heat treated surface for contact with the third ply.

Other objects, features and advantages of the present invention will become apparent from the subsequent description and the appended claims taken in conjunction with the accompanying drawing.

BRIEF DESCRIPTION OF THE DRAWING

The drawing illustrates in a generally side elevated plan view the processing equipment and/or operation for carrying out the invention described hereinafter.

SUMMARY OF THE INVENTION

Briefly stated the present invention comprises a process for preparing a heat sealed, dry, laminated product of at least four ply wherein, the first ply is a substrate layer, the second ply is an extruded film forming plastic material of a material dissimilar from the first ply, the third ply is a material layer dissimilar from the second ply, the fourth ply is a plastic material layer having a treated surface, said fourth ply being of a material dissimilar from the third ply, said method comprising the steps of: (A) heating said plastic material to form a hot extruded film forming plastic material of sufficiently elevated temperature such that it will cause a heat sealed bond between the third and fourth ply materials, (B) bringing the substrate layer into firm contact with the hot extruded film forming plastic material between a pair of oppositely rotating surfaces, (C) essentially simultaneously bringing the third ply layer into firm contact, between said rotating surfaces, with the extruded film forming plastic material, whereby said extruded material effectively bonds the first ply to the third ply, (D) essentially simultaneously bringing the fourth ply plastic material into firm contact, between said rotating surfaces, such that the treated surface thereof is in contact with the third ply, and whereby there is effectively produced a heat sealed bond between the third and fourth ply substantially due to heat generated from the hot extruded plastic material.

In another aspect, briefly stated, the present invention comprises a process for preparing a heat sealed, laminated product of at least three ply said product being comprised of: a ply of an extruded film forming plastic material, a ply of a material layer dissimilar to the extruded film forming plastic material, a ply of a plastic material dissimilar to said material layer and having a treated surface thereon which contacts said material layer, said method comprising the steps of: (A) heating said plastic material to form a hot extruded film forming plastic material of sufficiently elevated temperature such that it will generally cause a heat sealed bond between the treated surface of said plastic material and said material layer, (B) bringing the hot extruded plastic material into firm contact with said material layer between a pair of oppositely rotating surfaces, (C) essentially simultaneously bringing the surface treated plastic material into firm contact, between said rotating surfaces, such that the treated surface thereof is in contact with said material layer, and whereby there is effectively produced a heat sealed bond between the surface treated plastic material and said material layer substantially due to heat generated from the hot extruded plastic material.

DESCRIPTION OF PREFERRED EMBODIMENTS

A description will now be made of the preferred apparatus for carrying out the process as shown in the attached drawing hereto. It should be understood, however, that this description and the drawing are illustrative only and that modifications of the apparatus for carrying out the process described herein will be apparent to those skilled in the art.

The drawing illustrates ground level or floor 10 upon which is mounted a supporting frame or structure 12. The structure 12 holds in rotationally mounted position a chill roller 14, and the nip roller 16, and a backup roller 18. The nip roller is mounted such that it is in pressurized contact with the chill roller at the point generally designated 20 with the point 20 being in the general position between the nip roller and the chill roller where the layers of the laminate are pressed together in firm contact. The distance between rollers 14 and 16 in the drawing figure has been exaggerated for purposes of illustration. It should be understood that these two rollers are essentially in firm contact with one another and that the various plies or layers are firmly pressed into contact therebetween. The nip roller 16 normally has a rubber surface thereon which will be described further hereinafter.

The substrate layer designated 22 is fed to the nip 20 from a supply roller (not shown). There is also fed to the nip 20 an extruded film forming plastic material designated 30, which extruded material is fed from the hopper or extruder generally designated 32 by passage to the die designated 34. As is conventional with this type of extruder equipment the die 34 is in a heated condition and the extruded film forming material 30 passing through the die 34 is also in a hot melted condition as will be described in more detail hereinafter.

There is also fed to the nip 20 a third ply or layer material designated 40. The third ply 40 is also fed from a supply roller (not shown). A fourth ply material or layer designated 44 is also fed to the nip 20 from a supply roller (not shown).

The four ply finished product after passing through the nip section 20 moves around the outer surface of the chill roller 14 and then across suitable guide rollers such as those designated 50 and 52, and then the finished four ply laminate is wound onto a take-up roller designated 60.

As indicated in the drawing the chill roller is water cooled, however, it should be realized that numerous other fluids could be used for cooling of the chill roller. The chill roller, having a cooled surface facilitates the removal or peeling away of the finished laminate product from the chill roller (at which time it can be simultaneously trimmed or the like), then passed over the guide rollers 50 and 52 onto the take-up roller 60 where the finished product is collected.

It should also be noted that the backup roller 18 is also water cooled, or cooled by any other suitable fluid such that the backup roller in cooled condition is able to facilitate removal of a certain amount of the heat generated in the nip roller.

The substrate layer described herein may suitably be any material such as paper, cloth, metal foils, Mylar, cellophane, kraftpaper, paperboard, and various metal sheets, plastic sheets or other film sheets or packaging materials. It should also be specifically understood that the substrate layer may be of the supported film type. For example, a film forming resin may be precast from a polymer solution, of a material such as cellulose acetate, Mylar, vinyl chloride acetate copolymer, polyvinyl butyral or the like, on a supporting slip sheet having release properties. The supporting film thus formed may then satisfactorily be used as the substrate layer, and after formation of the laminated product the slip sheet could if desired be stripped from the product, for example at the rewind station. By using this supported film principle it is considered that films may be cast and handled in thicknesses less than $\frac{1}{10}$ of a mil.

The second ply or the extruded film forming plastic material preferably is comprised of an extrudable polyethylene plastic material. However, numerous other extruded film forming plastic materials may be used for the extrusion coating or film which forms the second ply and such other materials would be film forming extrudable polyolefins, extrudable vinyl resins, extrudable hot melt adhesives, and other extrudable plastic polymers and copolymers. These other such extrudable film forming plastic materials are known to those skilled in the art and need not be described in further detail here.

The third ply or material layer of the laminated product herein also may be comprised of numerous materials such as metal foils, metal sheets, paper, Mylar, certain forms of cloth sheets, certain forms of rubber sheeting materials, and numerous other plastic and/or metal sheets. The main criteria which governs the material selected for the third ply or layer is that such material must be relatively thin and a material which will conduct the heat generated by the extruded film forming plastic material such that the heat when conducted through the third layer is of a sufficient magnitude to cause a sealing or heat bonding between the third ply and the fourth ply materials. The preferred material for use as the third ply or layer would be a material from the group of metal foils, paper, or Mylar. The best material to date for use as the third ply or layer is a metal foil.

The fourth ply or plastic material layer is preferably a polyolefin material which is adaptable to be surface treated, that is, either subjected to electronic treatment or flame treatment to oxidize the surface thereof which comes in contact with the third ply, and in particular, such a material would be surface treated polyethylene.

While it is preferred that the plastic material layer be surface treated for the practice of this invention, it is not necessarily required for the reason that with polyvinyl chloride films, polyvinyl acetate-chloride copolymer films, ethylene vinyl acetate copolymer films, and numerous other film forming polymers a heat sealing or heat bonding will occur between the two films immediately adjacent the hot extrudate material without the necessity of a treated or oxidized surface on one side of the plastic material layer.

It should be understood that the surface treatments of the fourth ply material or layer may be carried out either just prior to lamination of the fourth ply or the surface treatment may be carried out in a separate operation after which the fourth ply or material layer is wound up into a roll and is ready for use in the process of this invention.

Furthermore, it should be understood that if both sides of the fourth ply or material layer are surface treated, then the fourth ply may be heat bonded not only to the third ply but it may also be heat sealed or bonded on its other side to one or more additional layers or plies (thereby forming a product of more than four plies) so long as the heat provided from the extrudate material is sufficient to effect a bond or heat seal when more than a four ply product is being made. Still further, while it should be understood that a polyolefin containing material is the preferred material for use as the fourth ply or layer in the process of this invention, there may also be used numerous other materials for the fourth ply such as those materials described in U.S. Pat. 3,081,214, and in particular these usable materials would be Mylar, ethylene glycol terephthalate polymer, cellulose ester compounds, regenerated cellulose materials, vinyl plastic compounds, and in general, polymers and copolymers, where feasible, of the aforementioned materials may also be used.

The thicknesses of the various plies or layers which make up the laminated product herein are generally limited in that each of the particular plies must have a thickness at or below a maximum beyond which the plies would not be sufficiently flexible to enable the proper operation of the process described herein. From a minimum thickness standpoint each of the plies may generally be extremely thin limited only by the strength of the particular material being used and the commercial availability of the variius materials which are usable as the various plies or layers in carrying out the process.

In particular, it has been found that the thickness of the first ply or substrate layer may broadly vary within the range from about 1/10 mil up to about 100 mils. Preferably the thickness of the substrate layer should be within the range of about 1/2 to about 50 mils and best results have been obtained when this thickness is within the range of about 1/2 up to about 20 mils. The thicknesses given above for the first ply or layer are exemplary, and should not be taken as a limitation on the invention, for example, it would be possible to use materials such as corrugated shipping container lined on one side only, foamed or expanded plastic sheet, or the like, as stock for the basic substrate layer. In this event the substrate layer could satisfactorily have a thickness well over 50 mils.

The thickness of the second ply, that is, the extruded film forming plastic material layer subsequent to passing through the die of the extruder and being deposited as a layer between the first and third plies passing through the nip section 20, should be such that the second ply has a thickness within the broad range of about 1/10 up to about 50 mils and preferably within the range of about 1/2 up to about 10 mils. Best results have been obtained when using a thickness of about 1/3 up to about 5 mils for the second ply. It should be understood, however, that the above thickness ranges are not to be considered as a limitation on the invention; and, for example the extruded film forming plastic could satisfactorily contain an expanding agent or the like such that the extrudate ply in expanded condition would have a reasonable thickness of 100 mils and even as high 250 mils.

The thickness of the third ply or material layer should broadly be within the range of about 1/10 up to about 50 mils, and preferably this thickness should be within the range of about 1/4 up to about 5 mils. Best results have been obtained when the thickness of the third ply is held to within the range of about 1/4 up to about 2 mils.

The thickness of the fourth ply or surface treated-oxidized plastic material layer should broadly be within the range of about 1/10 up to about 50 mils, and preferably this should be within the range of about 1/2 mil up to about 20 mils. Best results have been obtained when the thickness of the fourth ply is held to within the range of about 1 up to about 10 mils. It should also be understood, however, that the above thicknesses for the fourth ply are exemplary and should not be taken as a limitation on the invention. For example, the fourth ply could be a supported film, or a multi-laminate layer in itself, in which instance the fourth ply would have a thickness well above 50 mils. Still further, the fourth ply could satisfactorily be a foamed or expanded plastic sheet or the like, in which instance again thicknesses considerably higher than 50 mils would be psosible.

It should be understood all of the above thicknesses are generally dependent upon the particular material chosen for each ply in carrying out the lamination process herein. Generally certain of these thicknesses will be either higher or lower within the above specifications dependent upon the particular material used for each of the plies.

Furthermore it should be understood that the thicknesses specified hereinabove are not to be considered as limitations on the practice of this invention for the reason that the minimum thicknesses or the mavimum thicknesses may be circumvented by the use of supported films for any of the various laminated layers; and, still further it is readily conceivable that further developments in the area of film or sheet material for use in this invention could lead to new unsupported films or sheets which would be usable in the invention and which would have thicknesses less than those specified herein.

The extruder output capacity necessary for the practice of the lamination process described herein is not particularly critical in that (dependent upon the width of the laminated product being made and the linear speed of product being produced per minute) desired operating conditions will determine the necessary selection of extruder equipment size and the like. The proper selection of the extruder equipment and size thereof, as well as capacity thereof and pounds per hour of hot extrudate material does not form a critical feature of this invention.

The linear speed of laminated product produced in accordance with the process herein, may broadly vary within the range of about 25 up to about 2500 feet per minute. The lower range of linear speed would normally be used in carrying out the process when a heavy or dense extrudate material were being used as the second ply material described hereinabove. Preferably, the linear speed of product produced in carrying out the process herein should be within the range of about 100 up to about 1200 per minute, and best results to date have been obtained when this linear speed is within the range of about 180 up to about 350 feet per minute.

It should be understood that I use the linear speed of the substrate layer or the linear speed of the product produced which is approximately the same as the linear speed of the substrate material, as the governing criteria concerning the continuous movement of the various plies or layers through the apparatus in carrying out the process of this invention, that is, linear speed is used as the governing criteria as opposed, for example, to measuring the tension in the various films or sheets which make up the plies described above. Those skilled in the art are aware of the necessary techniques, such as braking the various supply rollers to control the tensions on the various sheets or plies which are being fed to the nip section 20. The braking technique just mentioned may suitably be carried out in my invention by controlling the speed of rotation of the various supply rollers by friction brakes on the axles of these various rollers as is known to those skilled in the art.

The temperature of the extruded film forming plastic material or extrudate material as described hereinabove after leaving the die of the extruder equipment and just prior to being deposited upon the surface of the third ply 40 at the point designated 40a in the drawing, should generally be within the broad range of about 200° F. up to about 700° F. Preferably this temperature of the extrudate material should be within the range of about 250° F. up to about 630° F., and best results have been obtained when the temperature of the extrudate material just subsequent to leaving the extruder die is within the range of about 590° F. up to about 620° F.

It should be understood that the overall and very important governing criteria which necessarily dictates what the temperature of the extrudate material should be is that the temperature of the extrudate must be sufficient to generate enough heat such that the four ply 44 will be heat sealed or bonded to the third ply 40, that is, such that the treated or oxidized surface 44a of the fourth ply will be properly heated, sealed or bonded to the third ply 40.

The temperature of the chill roller is also important to proper practice of my invention described herein in that the chill roller surface should be sufficiently cool such that the finished laminated product may easily be removed from or peeled away from the chill roller and then passed over the necessary guide rollers, trimming operations, etc., prior to being collected on the take-up roller 60 shown in the drawing. If the surface of the chill roller is allowed to become overly heated, then the finished laminated product is difficult to remove from or peel away from the chill roller.

The chill roller also serves the purpose of reducing the temperature of the finished laminated product which leaves the nip section 20 such that the finished product is at least partially cooled before being wound up on the take-up roller.

Generally stated, the surface of the chill roller should generally be less than about 120° F., and from a broad temperature range standpoint this temperature should be between about 90° F. and about 120° F. It should be understood that this temperature range is not a limitation on the practice of the invention.

Another important aspect of the process described herein is the application of an extruded film forming plastic material by exrusion coating on the substrate layer, which coating at the same time bonds the substrate layer or first ply to the third ply material described hereinabove. The extrusion coating described herein is carried out by extruding the molten film forming plastic material through a flat film die and the film is then drawn down from the die into the nip of the two rolls 14 and 16 located directly below the die 34. The substrate layer 22 is introduced over the rubber pressure roll or nip roller 16 and the substrate layer is then forced against the hot extruded film at the nip section 20. Simultaneously, the extruded or molten film forming plastic material is generally solidified and cooled by the chill roller 14. As the extrusion coating continues in indirect contact or relative closeness to the chill roller 14, it is further cooled and solidifies to form the second ply of the laminated product produced herein prior to being wound up on the take-up roller 60.

It should be understood that the extrusion coating aspect of the invention described herein forms one portion of a very complex process comprising many variables each of which effect the quality of the final or finished laminated product. These individual variables have been considered above in detail to a certain extent, however, it should be understood that I have discovered that the very complex process described herein may be carried out to produce a highly satisfactory finished product and also I have discovered that so long as the subtle interreaction of the above variables is properly controlled that a highly desirable and commercially acceptable finished laminated product may be produced using the process herein in what may be termed a once through operation.

For further descriptions of extrusion coating techniques, reference is here made to the article "Polyethylene Extrusion Coatings" in the journal, Modern Packaging, April 1957 issue; and, the article "New Developments in Extrusion Coating" in the journal Plastics Technology, September 1966 issue. It should definitely be understood that while polyethylene constitutes the best material for use as the extrudate or extruded film forming plastic material described herein, that numerous other materials may also be used.

The treated or oxidized surface of the fourth ply material, that is, the surface treated polyolefin or plastic material layer which contacts the third ply may be prepared or surface treated by two physical methods. These two physical methods may be termed either flame treatment or electronic treatment, either of which treatments generally oxidizes the surface of the polyolefin or plastic material to render the surface more susceptible for proper bonding or heat sealing to the third ply. One electronic treatment for preparation of the polyolefin or plastic material of this type is generally described in U.S. Pat. 3,018,189, and flame treatment for surface treating such a polyolefin or plastic material is described in U.S. Pat. 3,075,868.

As described above the temperature of the extrudate material just prior to making contact with third ply at the point designated 40a in the drawing, should generally be within the broad range of about 200° F. up to about 700° F. It is critical to the practice of the invention described herein that the heat generated by the extrudate material be of a sufficient magnitude such that the surface treated or oxidized surface of the fourth ply or layer, is brought up to a temperature which broadly stated, should not be less than about 150° F. Preferably, the heat generated by the extruded material should be such that the oxidized surface of the fourth ply is brought up to a temperature of about 200° F. and best results have been obtained when the oxidized surface of the fourth ply is brought up to a temperature of at least about 250° F. or higher due to the heat generated by the extrudate material. This heat generated by the extrudate material is critical in that it provides for the proper bonding or heat sealing of the fourth ply to the third ply such that the entire process described herein can be carried out in a once through manner by passing the four plies through the nip section 20 formed between the two rollers 14 and 16. I have found that unless this generated heat or temperature is properly controlled and maintained that then the practice of my invention cannot be satisfactorily carried out.

In the preparation of the four ply product generally described above, as previously mentioned, I have used a rubber or resilient material surfaced roller as the nip roller 16. Generally stated, this rubber surface may have a hardness within the range of about 60 to about 90 durometer hardness. It should be understood that the lower limit of 60 durometer hardness would not be applicable if for example a soft expanded material were being used, as the material forming the extruded film forming plastic, or as the material forming the substrate layer or the fourth layer. In this event the nip roller or pressure roll would have to be of a considerably softer nature ranging in hardness from sponge rubber up to 60 durometer. Preferably when preparing the four ply products such as those described above a rubber or other resilient surfaced roller should be used with a hardness within the range of about 60 to about 70 durometer hardness, and best results have been obtained using a surface in the range of about 65 to about 70 durometer hardness. It has been found that a rubber or resilient material surfaced roller, as described above, when properly selected dependent upon the various materials used as the different ply layers in the product, provides what may be termed a contact duration or dwell between the two rollers in the nip section 20 amounting to about one inch to about 1½ inches preferably, and broadly between about ½ inch and about 2 inches. It should be understood that at higher web speeds or higher linear speeds of producing the products in accordance with this invention a single nip roller may not be sufficient to obtain the necessary amount of film or pressurized contact time between the plies of the product and that therefore it may be desirable to use one or more additional nip rollers (not shown) after the initial contact which occurs between the nip roller 16 and the roller 14, but before the finished product is removed from the roller 14. By this it is meant in general that a definite time is required for the heat of the extrudate material to penetrate the nip adjacent layer material and thereby cause a heat sealed bond between the nip adjacent layer and the ply which it contacts. At high web speeds the heat may not be given sufficient time to penetrate the adjacent layer in the nip span described above and for this reason additional nip or rollers would be necessary.

The process described hereinabove has been generally directed to the formation of a four or more plies laminated product. A description will now be given of another embodiment of the porcess invention herein wherein my invention may be used to form a three ply product.

As may be seen in the drawing figure if the first ply 22 is omitted from passage through the nip section 20, that is, if the first ply 22 is simply omitted from the process, then a three ply laminated product comprised of ply 40, and the ply formed by the extruded film 30 is formed. Such a three ply product still embodies a main principle of my invention, that is, the hot extruded film 30 which generates a substantial amount of heat (as is delineated hereinabove) provides a sufficient heating effect on the ply 40 such that the heat is transferred through ply 40 and is of sufficient magnitude to cause a heat bonding or sealing between the treated surface 44a of ply 44 such that the treated surface 44a is bonded to the ply 40. The process to produce such a three ply product is generally the same as the process described hereinabove except that the first ply 22 is omitted from the operation. The result of preparing such a three ply product in accordance with my invention has many utilities as will be described hereinafter, however, in particular this process produces in a unique and economical manner a product which through proper choice of materials to form the ply 30 and the ply 44 results in a finished sheeting material which is heat sealable on both of its exterior sides. Furthermore this type of three ply product differs very essentially from an extrision sandwich lamination three ply product due to the concept discovered and disclosed herein which is based on the phenomena that the heat generated by the hot extrudate material may be used to heat seal or bond a second and third ply while at the same time the hot extrudate is deposited as a film or layer forming the first ply of the product.

An important aspect of forming a three ply product as described immediately above is that the surface of the nip roller should be a surface having excellent release characteristics since in the absence of the ply or layer 22 the hot and relatively sticky extruded film 30 makes direct contact with the nip roller 16. Therefore, in order to provide the nip roller 16 with a surface having good release characteristics, it has been found that the surface of the nip roller may be covered with a Teflon tape material, or it may be covered with a silicone material, or numerous other materials so long as the surface of the nip roller in contact with the hot extruded film 30 possesses good release characteristics so that the extruded film 30 will not stick to the nip roller 16. It should furthermore be understood that when a material having good release characteristics is used for this purpose in covering the nip roller 16, such as for example a Teflon tape covering, that such tape-like material normally will be sufficient flexibility such that the resiliency or hardness characteristics described above for the surface of the nip roller 16 are fulfilled.

Another variation of forming a product containing at least three or more plies as described hereinabove is that the plastic material layer may be passed directly over the nip roller, and then a material layer such as paper, foil, cellophane, etc. may be passed also over the nip roller such that it is brought into contact with a treated surface side of the plastic material layer (if a treated surface is used) and then these two layers are brought into contact with the extruded film forming plastic material, such that the three ply product formed is one wherein the extrudate is in contact with the seal roller rather than the nip roller as described above.

Still another variation of forming a product of at least three or more plies generally in the fashion as described above, would be to pass a substrate layer, for example of a temperature sensitive material, directly over the nip roller while at the same time and essentially simultaneously passing a plastic material layer over the nip roller (with the plastic material layer overlying the substrate layer), and then forming the third ply or layer of the product from a hot extruded film forming plastic which contacts the plastic material layer on one side and the chill roller or other ply layer(s). An underlying purpose for this particular variation would be to the effect that many substrate materials are extremely temperature sensitive. For example, certain types of cellophane, Mylar, vinyl films, Mylar films, etc. could be categorized as such temperature sensitive materials. If it were desired, for example, to apply a 2–3 mil polyolefin coating to one side of such a temperature sensitive substrate, then in order to achieve satisfactory adhesion of the polyolefin film to the substrate material it could be carried out or accomplished in the following manner. First, a polyolefin extruded film having an exemplary thickness of ½ mil to 10 mils would be extruded at a melt temperature of about 350–450° F. This extruded film would be brought into firm contact with at least two other films or layers as follows, between the rotating surfaces. Said two other films or layers would be for example a temperature sensitive substrate material of at least ¼ mil thickness which is passed directly over the nip roller; and, a second layer for example of a polyolefin film which is heavily surface treated on its side which contacts the substrate, and with said second layer having an exemplary thickness of about ½ mil to 5 mils. The first and second layers would be passed directly over the nip roller with the substrate or first layer being in contact with the nip roller. The third layer (or additional layers beyond three if used) would be the extruded polyolefin layer which would contact the second layer polyolefin film and transfer sufficient heat thereto such that the opposite surface treated side of the second layer would heat seal or bond to the temperature sensitive substrate. In carrying out this particular variation of a three ply operation it is to be noted that the polyolefin extruded film of the third layer and the polyolefin film of the second layer could be of identical materials such as polyethylene such that a bond betwen the second and third layers would be formed, even though the melt temperature of the extruded polyethylene would be considerably lower than 590° F., which is the conventional temperature at which extruded polyethylene is heat sealed to another layer when using an oxidized or chemical bond between polyethylene and another dissimilar material. In this exemplary situation it is the oxidized layer or surface treated side of the second ply that adheres to the substrate and this particular seal between the substrate and the second layer will occur at temperatures between about 200° F. and 300° F. which is well below the softening or melting point of numerous temperature sensitive substrates. An advantage of this particular three ply variation is that in extruding certain thermoplastic polymers, onto any substrate material (regardless of whether that substrate is temperature sensitive) that will not stand high extrusion temperatures without severe damage or decomposition, such as ethylene vinyl acetate copolymers, vinyl chloride, vinyl chloride acetate copolymers, styrene, acrylates, or the like, a very significant bonding or adhesion to the substrate material at the necessary low temperatures may be satisfactorily obtained using the above described thin layer of highly treated polyolefin or polyethylene film, while at the same time staying well below the decomposition temperature of the extrudate.

The process, and product produced thereby, in accordance with this disclosure have numerous and different utilities. For example, the process can be used for producing packaging materials for food, or for producing materials from which accessory packets may be constructed with said accessory packets being for the purpose of containing cigarettes, matches, chewing gum, or numerous other items. Still further, the process disclosed herein may be used for preparing barrier materials for sealing and/or moisture-proofing various items. Still further, numerous other uses of my invention disclosed herein will be apparent to those skilled in the art.

Furthermore, the advantages of the process invention and product disclosed herein will also be apparent from the above description, however, in order to be more specific the advantages of the present invention are: (1) a substantial economic advantage or savings is realized from the fact that trim losses are absolutely minimized due to the fact that the process described herein produces a four ply dry lamination product in a once through operation, (2) the process described herein results in a very significant and substantial time saving from the standpoint that in prior art processes for producing products of a nature approximately similar to the products disclosed herein it was generally necessary to use a twice through operation (or multiple nip operation) in order to arrive at the product produced in the once through process operation disclosed herein, and (3) the process disclosed herein has been found to be considerably more economical, and commercially feasible than prior art processes for producing a generally similar product. Other advantages will be apparent to those skilled in the art and need not be detailed at this point.

I claim:

1. A process for preparing a heat sealed, laminated product of at least three ply, said product being comprised of:

a ply of an extruded film forming plastic material, a ply of a material layer made of a dissimilar material relative to the extruded film forming plastic material, a ply of plastic material made of a dissimilar material relative to said material layer and having a treated surface thereon which contacts said material layer, said treated surface being formed by flame treatment or electronic treatment, said method comprising the steps of:

(A) heating said plastic material to form a hot extruded film forming plastic material of sufficiently elevated temperature such that it will generally cause a heat sealed bond between the treated surface of said plastic material and said material layer, (B) bringing the hot extruded plastic material into firm contact with said material layer between a pair of rotating surfaces, (C) essentially simultaneously bringing the surface treated plastic material into firm contact, between said rotating surfaces, such that the treated surface thereof is in contact with said material layer, thus producing a heat sealed bond between the surface treated plastic material and said material layer substantially due to the heat generated from the hot extruded plastic material.

2. A process for preparing a heat sealed, dry, laminated product of at least four ply wherein:

the first ply is a substrate layer, the second ply is an extruded film forming plastic material made of a dissimilar plastic material relative to the first ply, the third ply is a material layer made of a dissimilar material relative to the second ply, the fourth ply is a plastic material layer having a treated surface, said fourth ply being made of a dissimilar material relative to the third ply, said treated surface being formed by flame treatment or electronic treatment, said method comprising the steps of:

(A) heating said plastic material to form a hot extruded film forming plastic material of sufficiently elevated temperature such that it will cause a heat sealed bond between the third and fourth ply materials, (B) bringing the substrate layer into firm contact with the hot extruded film forming plastic material between a pair of rotating surfaces, (C) essentially simultaneously bringing the third ply layer into firm contact, between said rotating surfaces, with the extruded film forming plastic material, whereby said extruded material effectively bonds the first ply to the third ply, (D) essentially simultaneously bringing the fourth ply plastic material into firm contact, between said rotating surfaces, such that said surface thereof is in contact with the third ply, thus producing a heat sealed bond between the third and fourth ply substantially due to heat generated from the hot extruded plastic material.

3. The process of claim 1 wherein, said elevated temperature is within the range of about 250 to about 630° F.

4. The process of claim 1 wherein, said elevated temperature is within the range of about 590° to about 620 F.

5. The process of claim 1 wherein, said extruded film forming plastic material is a polyolefin material.

6. The process of claim 2 wherein, said elevated temperature is within the range of about 590° to about 620° F.

7. The process of claim 2 wherein, said product is produced at a rate of between about 100 and about 1200 linear feet of product per minute.

8. The process of claim 2 wherein:

said extruded film forming plastic material is a substantially polyolefin material, and said fourth ply plastic material layer is a substantially polyolefin material.

9. A process for preparing a heat sealed, dry, laminated product of at least four ply wherein:

the first ply is a substrate layer having a thickness not less than 1/10 mil, the second ply is an extruded film forming plastic material having a thickness of about 1/10 to about 50 mills, said second ply being made of a dissimilar material relative to the first ply, the third ply is a material layer having a thickness between about 1/10 to about 50 mils, said third ply being made of a dissimilar material relative to the second ply, the fourth ply is plastic material layer having a treated surface thereof which contacts the third ply, and having a thickness to about 1/10 to about 50 mils, said fourth ply being made of a dissimilar material relative to the third ply, said treated surface being formed by flame treatment or electronic treatment, said method compising the steps of:

(A) heating said plastic material to form a hot extruded film forming plastic material of sufficiently elevated temperature such that it will cause a heat sealed bond between the third and fourth ply materials, (B) bringing the substrate layer into firm contact with a hot extruded film forming plastic material between a pair of rotating surfaces, one of which is a cooled roller surface, (C) essentially simultaneously bringing the third ply layer into firm contact, between said rotating surfaces, with the extruded film forming plastic material, whereby said extruded material effectively bonds the first ply to the third ply, (D) essentially simultaneously bringing the fourth ply plastic material into firm contact, between said rotating surfaces, such that the treated surface thereof is in contact with the third ply, thus producing a heat sealed bond between the third and fourth ply substantially due to heat generated from the hot extruded plastic material, (E) collecting the laminated product.

10. The process of claim 9 wherein, said elevated temperature is within the range of about 590° to about 620° F.

11. The process of claim 10 wherein:
said first ply has a thickness about ½ to about 50 mils,
said second ply has a thickness of about ½ to about 10 mils,
said third ply has a thickness of about ¼ to about 5 mils,
said fourth ply has a thickness of about ½ to about 20 mils.

12. The process of claim 11 wherein, said product is produced at a rate of between about 100 and about 1200 linear feet of product per minute.

13. The process of claim 9 wherein:
said extruded film forming plastic material is a substantially polyolefin material, and
said fourth ply plastic material layer is a substantially polyolefin material.

14. The process of claim 9 wherein:
said elevated temperature is within the range of about 590° to about 620° F.,
said product is collected at a rate between about 180 to about 350 linear feet of product per minute,
said first ply has a thickness of about ½ to about 20 mils,
said second ply has a thickness of about ⅓ to about 5 mils,
said third ply has a thickness of about ¼ to about 2 mils,
said fourth ply has a thickness of about 1 to about 10 mils.

15. A process for preparing a heat sealed, dry laminated product of at least three ply, said product being comprised of:
a ply of an extruded film forming plastic material having a thickness greater than about ⅒ mil,
a ply of a material layer having a thickness between about ⅒ to about 50 mils, said material layer being made of a dissimilar material relative to the extruded film forming plastic material,
a ply of plastic material made of a dissimilar material relative to said material layer and having a treated surface thereof which contacts said material layer, and having a thickness of about ⅒ to about 50 mils, said treated surface being formed by flame treatment or electronic treatment, said method comprising the steps of:

(A) heating said plastic material to form a hot extruded film forming plastic material of sufficiently elevated temperature such that it will generally cause a heat sealed bond between the treated surface of said plastic material and said material layer, (B) bringing the hot extruded plastic material into firm contact with said material layer between a pair of moving surfaces, (C) essentially simultaneously bringing the surface treated plastic material into firm contact, between said moving surfaces, such that the treated surface thereof is in contact with said material layer, thus producing a heat sealed bond between the surface treated plastic material and said material layer, (D) collecting the laminated product.

16. The process of claim 15 wherein:
said extruded film forming plastic material is substantially of polyethylene, and
said fourth ply is substantially of polyethylene.

17. The process of claim 15 wherein, said elevated temperature is within the range of about 250° to about 630° F.

18. The process of claim 17 wherein, said rate is between about 100 and 1200 linear feet of product per minute.

19. The process of claim 18 wherein:
said elevated temperature is within the range of about 590° to about 620° F.
said product is produced at a rate between about 180 to about 350 linear feet of product per minute.

20. A process for preparing a heat sealed, laminated product of at least three ply, said product being comprised of:
a ply of an extruded film forming material, with there being located on one side thereof, in interchangeable position relationship,
a ply of a material layer, and
a ply of a plastic material layer made of a dissimilar material relative to said material layer and having a treated surface thereon which contacts said material layer, said treated surface being formed by flame treatment or electronic treatment, said method comprising the steps of:

(A) heating said film forming material to form a hot extruded film of sufficiently elevated temperature such that it will generally cause a heat bonded between said surface of said plastic material layer and said material layer, (B) bringing the hot extruded material into firm contact with one of said material layers between a pair of rotating surfaces, (C) essentially simultaneously bringing the other of said material layers into firm contact, between said rotating surfaces, such that the said surface of the plastic material layer is in contact with said material layer, thus producing a heat sealed bond between said surfaces and said material layer substantially due to the heat generated from the hot extruded film forming material.

21. The process of claim 20 wherein, said elevated temperature is within the range of about 200° F. and about 700° F.

22. The process of claim 20 wherein, said elevated temperature is within the range of about 590° F. and about 620° F.

23. A process for preparing a heat sealed, laminated product of at least three ply, said product being comprised of:
a ply of an extruded film forming plastic material,
a ply of a material layer made of a dissimilar material relative to the extruded film forming plastic material,
a ply of a plastic material made of a dissimilar material relative to said material layer and having an oxidized surfce thereon which contacts said material layer, said method comprising the steps of:

(A) heating said plastic material to form a hot extruded film forming plastic material of sufficiently elevated temperature such that it will generally cause a heat sealed bond between the oxidized surface of said plastic material and said material layer, (B) bringing the hot extruded plastic material into firm contact with said material layer between a pair of rotating surfaces, (C) essentially simultaneously bringing the surface oxidized plastic material into firm contact, between said rotating surfaces, such that the oxidized surface thereof is in contact with said material layer, thus producing a heat sealed bond between the surface oxidized plastic material and said material layer substantially due to the heat generated from tthe hot extruded plastic material.

24. A process for preparing a heat sealed, dry, laminated product of at least four ply wherein:
  the first ply is a substrate layer,
  the second ply is an extruded film forming plastic material made of a dissimilar plastic material relative to the first ply,
  the third ply is a material layer made of a dissimilar material relative to the second ply,
  the fourth ply is a plastic material layer having an oxidized surface, said fourth ply being made of a dissimilar material relative to the third ply, said method comprising the steps of:
  (A) heating said plastic material to form a hot extruded film forming plastic material of sufficiently elevated temperature such that it will cause a heat sealed bond between the third and fourth ply materials,
  (B) bringing the substrate layer into firm contact with the hot extruded film forming plastic material between a pair of rotating surfaces,
  (C) essentially simultaneously bringing the third ply layer into firm contact, between said rotating surfaces, with the extruded film forming plastic material, whereby said extruded material effectively bonds the first ply to the third ply,
  (D) essentially simultaneously bringing the fourth ply plastic material into firm contact, between said rotating surfaces, such that said surface thereof is in contact with the third ply, thus producing a heat sealed bond between the third and fourth ply substantially due to heat generated from the hot extruded plastic material.

25. A process for preparing a heat sealed, dry, laminated product of at least three ply, said product being comprised of:
  a ply of an extruded film forming plastic material having a thickness greater than about $1/10$ mil,
  a ply of a material layer having a thickness between about $1/10$ to about 50 mils, said material layer being made of a dissimilar material relative to the extruded film forming plastic material,
  a ply of a plastic material made of a dissimilar material relative to said material layer and having an oxidized surface thereof which contacts said material layer, and having a thickness of about $1/10$ to about 50 mils, said method comprising the steps of:
  (A) heating said plastic material to form a hot extruded film forming plastic material of sufficiently elevated temperature such that it will generally cause a heat sealed bond between the oxidized surface of said plastic material and said material layer,
  (B) bringing the hot extruded plastic material into firm contact with said material layer between a pair of rotating surfaces,
  (C) essentially simultaneously bringing the surface oxidized plastic material into firm contact, between said moving surfaces, such that the oxidized surface thereof is in contact with said material layer, thus producing a heat sealed bond between the surface oxidized plastic material and said material layer,
  (D) collecting the laminated product.

References Cited
UNITED STATES PATENTS

| | | | |
|---|---|---|---|
| 2,965,530 | 12/1960 | Stamm et al. | 156—309 X |
| 3,003,903 | 10/1961 | Vaughan | 156—309 X |
| 3,008,862 | 11/1961 | Haine et al. | 156—244 |
| 3,183,137 | 5/1965 | Harmon et al. | 156—309 |
| 3,075,868 | 1/1963 | Long | 156—82 |

CARL D. QUARFORTH, Primary Examiner

S. J. LECHERT, JR., Assistant Examiner

U.S. Cl. X.R.

156—244, 272, 306, 309, 322, 324